(12) United States Patent
Sinno et al.

(10) Patent No.: US 11,968,383 B2
(45) Date of Patent: Apr. 23, 2024

(54) QUALITY-SPARING CODE BURN-IN FOR VIDEO

(71) Applicant: Apple Inc., Cupertino, CA (US)

(72) Inventors: Zeina Sinno, Santa Clara, CA (US); Steven E. Saunders, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 175 days.

(21) Appl. No.: 17/491,944

(22) Filed: Oct. 1, 2021

(65) Prior Publication Data
US 2022/0109866 A1    Apr. 7, 2022

Related U.S. Application Data

(60) Provisional application No. 63/086,834, filed on Oct. 2, 2020.

(51) Int. Cl.
*H04N 19/46* (2014.01)
*H04N 17/00* (2006.01)
*H04N 19/154* (2014.01)
*H04N 19/176* (2014.01)

(52) U.S. Cl.
CPC ............. *H04N 19/46* (2014.11); *H04N 17/00* (2013.01); *H04N 19/154* (2014.11); *H04N 19/176* (2014.11)

(58) Field of Classification Search
None
See application file for complete search history.

(56) References Cited

U.S. PATENT DOCUMENTS

| | | | |
|---|---|---|---|
| 11,234,059 B1* | 1/2022 | Ram | H04N 21/2393 |
| 2015/0030084 A1* | 1/2015 | Marchya | H04N 17/004 375/240.26 |
| 2017/0208335 A1* | 7/2017 | Ramamurthy | H04N 19/156 |

(Continued)

OTHER PUBLICATIONS

Barkowsky et al.; "Comparison of Matching Strategies for Temporal Frame Registration in the Perceptual Evaluation of Video Quality"; 2nd Int'l Workshop on Video Processing and Quality Metrics for Consumer Electronics; 2006; https://www.semanticscholar.org/paper/Comparison-of-Matching-Strategies-for-Temporal-in-Barkowsky-Bitto/a9004c325c913167761a61072469f3035b0c842a?p2df; abstract only.

(Continued)

*Primary Examiner* — Kaitlin A Retallick
(74) *Attorney, Agent, or Firm* — BakerHostetler

(57) ABSTRACT

Techniques are presented for inserting markers into a video stream. For each frame of an encoded video stream, disclosed techniques may determine a structure of macroblocks from a code of the frame, and then, select macroblocks to be replaced from the determined structure of macroblocks. Inserting a marker into a frame may be carried out by replacing codes of the selected macro blocks with a code of a marker that identifies the frame. Marking frames of the video stream may facilitate finding correspondence between frames from the video stream before transmission over a channel and the video stream received from the channel, based on the inserted markers. Knowledge of frame correspondence may enable a video quality metric estimation based on a comparison between the found corresponding frames.

28 Claims, 5 Drawing Sheets

(56) References Cited

U.S. PATENT DOCUMENTS

2021/0037284 A1* 2/2021 Brice ................... G06V 10/25
2021/0176289 A1* 6/2021 Franklin .......... H04N 21/26258

OTHER PUBLICATIONS

Lee et al.; "Video frame-matching algorithm using dynamic programming"; Journal of Electronic Imagining; vol. 18; Jan. 2009; p. 010504-1 to 010504-3.

* cited by examiner

100

200

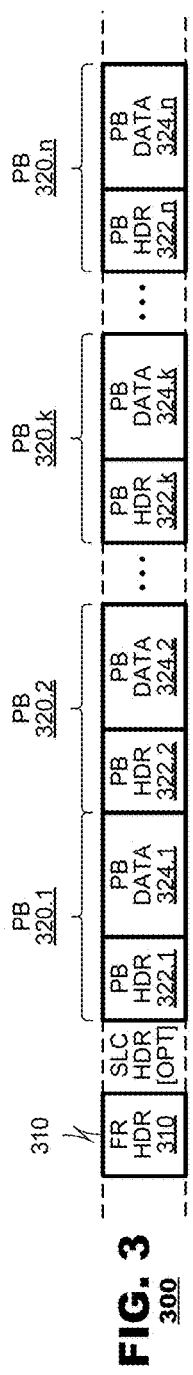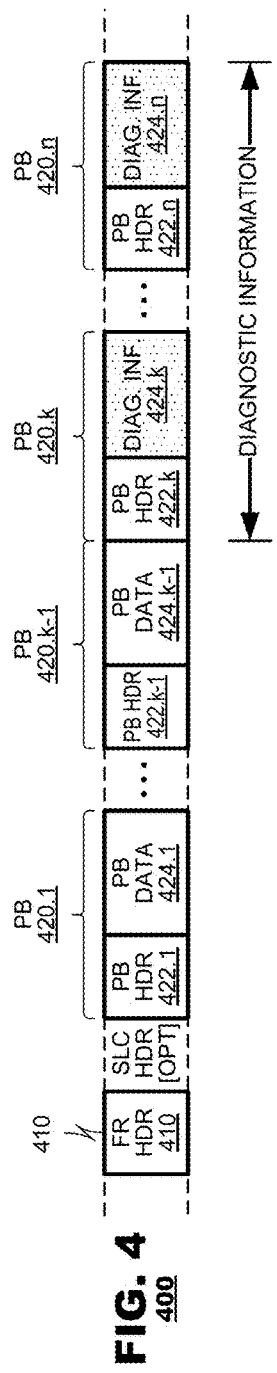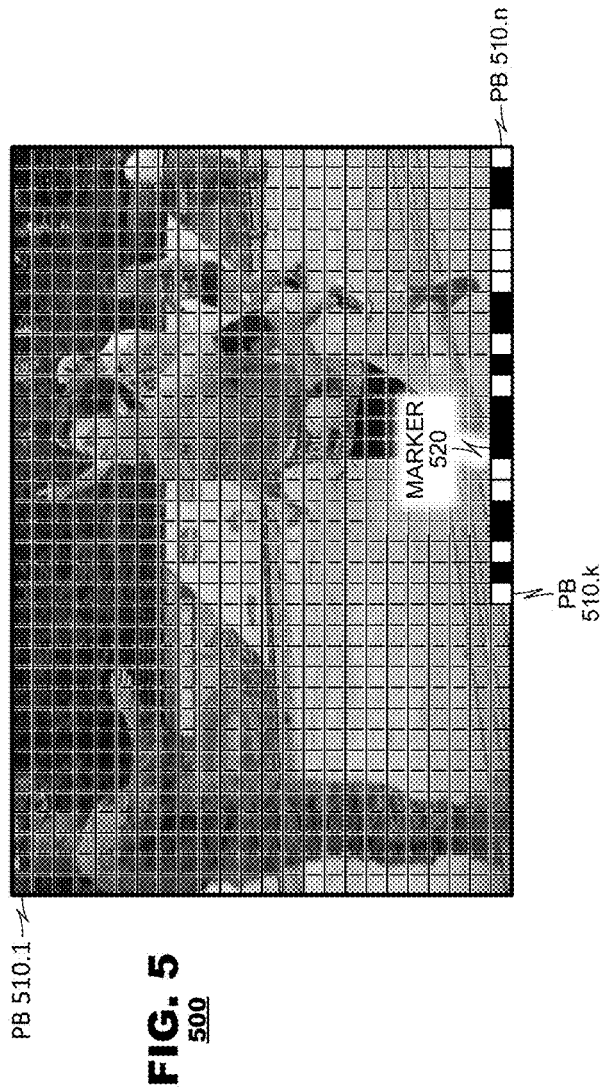
FIG. 3 300
FIG. 4 400
FIG. 5 500

600

700

800

900

1000

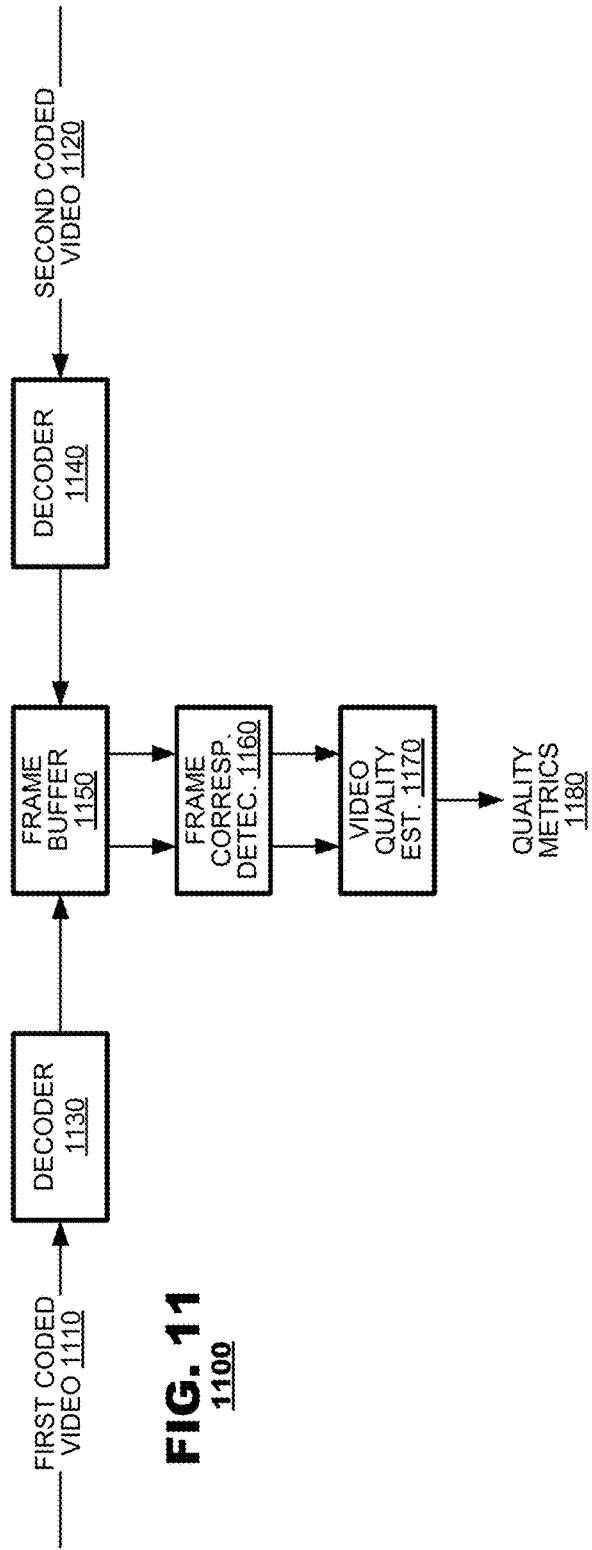
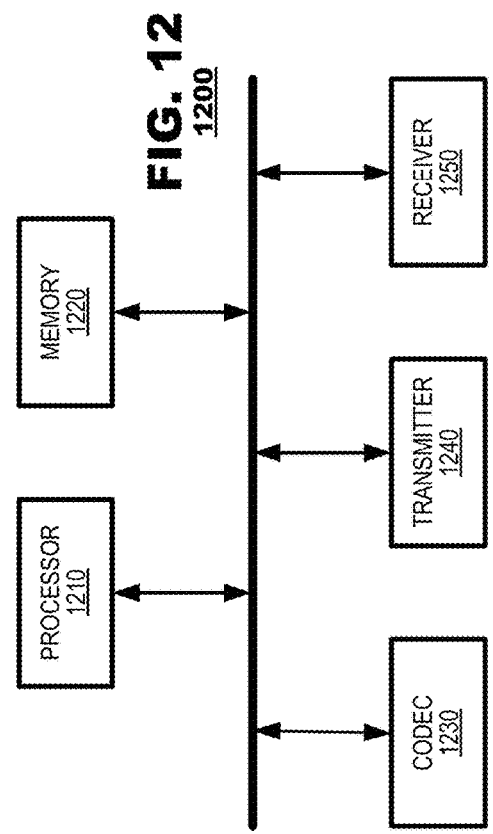

QUALITY-SPARING CODE BURN-IN FOR VIDEO

CROSS REFERENCE TO RELATED APPLICATIONS

This application claims benefit under 35 U.S.C. § 119(e) of Provisional U.S. Patent Application No. 63/086,834, filed Oct. 2, 2020, the contents of which is incorporated herein by reference in its entirety.

BACKGROUND

The present disclosure relates to diagnostic techniques for video delivery applications, in particular to techniques for inserting frame indicia into visual content of a video stream while preserving the majority of the content of the frame with minimal alteration of video quality.

Many video delivery applications perform data compression ("video coding") and recovery ("video decoding") operations on the video as it is delivered from a video source device to a video sink device. The data compression operations exploit redundancies in source video content to reduce the bandwidth of the video, which causes the video to consume fewer resources as it is transmitted over a data network than would be consumed by an uncompressed version of the video. A video sink device performs data recovery operations that typically invert compression operations and yields recovered video that can be consumed by the video sink device, typically by video display or other processing operations. Data compression and recovery operations typically are "lossy" processes; the recovered video exhibits some amount of distortion as compared to the source video even in ideal operating conditions when communication bandwidth is plentiful and when communication errors do not occur.

Video delivery applications employ a variety of techniques to compensate for non-ideal operating conditions. Communication bandwidth may not always be plentiful or it may change erratically. Some video coders may respond to loss of communication bandwidth by reducing the data rates at which they code source video, which incurs higher levels of coding distortion. Video coders further may drop frames from a video sequence either before it is coded or after coding but before transmission. Moreover, frame dropping may occur at other locations along a communication delivery path, not just at a video coder. Video decoding applications often engage in processes to mitigate the perceived distortion that frames dropping creates by altering the display rates of non-dropped frames once they are recovered.

Developers of video delivery applications often measure the performance of their coding systems by measuring quality of video that is recovered at video sink devices. As part of such measurements, it can be advantageous to capture recovered video and compare it to the source video from which it is generated. Thus, such developers have a need to associate a frame that is recovered by a video decoder with the source frame from which it was generated.

Video quality monitoring devices and services have been developed to assist developers with this association. One approach inserts visible indicia into video streams that identify the video streams' frames, such as markers representing a time code or a frame number. The inserted markers become part of the displayed content of the frame, which can be observed, for example, when frames are recovered by video decoders and when they are displayed by video sink devices. Such monitoring services, however, can interfere with coding operations because, when visible indicia replace video content from a source sequence, it can alter the coding decisions that a video coder applies to reduce the content's bandwidth.

Alternatively, visible indicia may be inserted to a coded video stream. Such insertion requires transcoding of the video stream, that is decoding the video, inserting indicia to the decoded frames' content, and re-encoding the video. This additional processing (transcoding) introduces additional distortion to the unmodified part of the video frame content, thereby affecting following video quality measurements. Therefore, techniques that insert indicia directly into the coded video stream without the need to transcode the video stream will allow measuring video degradation that is not due to the insertion process.

Another approach for frame association does not alter visible content of frames that are coded and decoded. This technique requires a search-based comparison of content from frames recovered by a video decoder to source frames that are processed by a video encoder. The approach consumes high computing power and it is unable to associate frames that have stationary content or lack of content (e.g., frames that have entirely white content or entirely black content).

BRIEF DESCRIPTION OF THE DRAWINGS

FIG. 3 illustrates an exemplary data stream generated during run time operation according to an aspect of the present disclosure.

FIG. 4 illustrates an exemplary data stream generated to support a diagnostic mode according to an aspect of the present disclosure.

FIG. 5 illustrates an exemplary video frame having embedded diagnostic information according to aspects of the present disclosure.

FIG. 11 is a block diagram of a diagnostic system according to an aspect of the present disclosure.

FIG. 12 is a simplified block diagram of a processing system according to an aspect of the present disclosure.

DETAILED DESCRIPTION

Aspects of the present disclosure describe techniques for inserting diagnostic information into frames of a video stream without altering video coding decisions that are applied to content of the frames unmodified by the insertion. In an aspect, for each frame of an encoded video stream, a method may code a source frame by video coding. The method may replace a predetermined syntactic element of a coding protocol that represents visual information of the coded frame with content representing the diagnostic information. The method may transmit the coded data of the frame so modified to a destination device. In this regard, the video coding decisions that are applied to the unmodified content of the source frame are not affected by the presence of diagnostic information.

Figure 1:
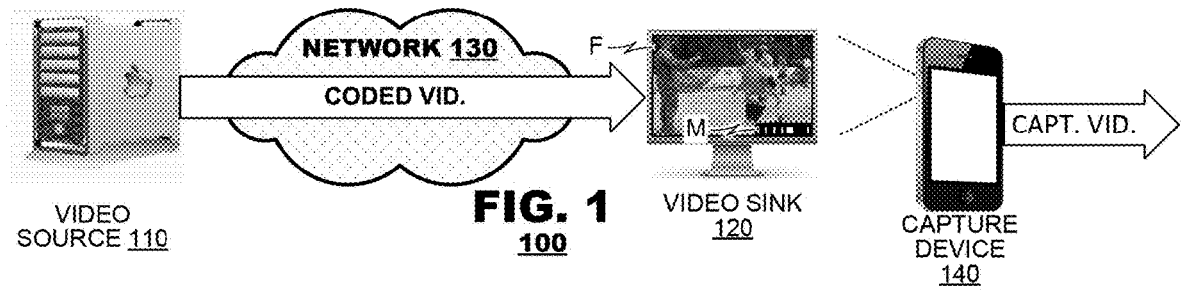
FIG. 1 is a block diagram of a system according to an aspect of the present disclosure.

FIG. 1 illustrates a system 100 according to an aspect of the present disclosure. The system 100 may include a video source 110 and a video sink 120 provided in communication via a network 130. During ordinary runtime operation, the video source 110 may supply coded video to the video sink 120 over the network. The coded video may be coded according to a data compression technique, such as a prevailing video coding standard. The video may be coded, for example, according to a prevailing coding protocol such as the ITU-T's H.265 ("HEVC"), H.264 ("AVC"), or H.263, as well as AV1, AV2 or VP9. The video sink 120 may receive the coded video from the network 130 and may decode it. Decoded video may be stored for later use by the video sink 120, may be processed by application program(s) executing on the video sink 120, or may be displayed on a display device of the video sink 120. The example of FIG. 1 illustrates a frame F being displayed on the video sink 120.

Aspects of the present disclosure may embed diagnostic information into video content during a diagnostic mode of operation. According to such aspects, coded video data may include diagnostic markers as part of the frames' video content. The diagnostic markers may uniquely identify each frame of a source video sequence from which the coded frames were generated. When the coded video is decoded by the video sink 120, the diagnostic markers may be displayed by the video sink as part of the recovered content. Thus, the example of FIG. 1 illustrates the displayed frame F as including a diagnostic marker M, which is displayed as part of the frame F.

FIG. 1 also illustrates a capture device 140. The capture device 140 may capture content displayed by the video sink 120, which may be processed for diagnostic purposes. The capture device 140 typically captures displayed content at twice the expected frame rate of the recovered video, which captures a video sequence that should be useful for diagnostic purposes. When diagnostic markers M uniquely identify each frame recovered from the coded video data, the captured video sequence should permit identification of frames that, for example, were dropped by the video source 110, the network 130, and/or the video sink 120.

In an aspect, the coded video, received by the video sink 120, may be stored or buffered at a storage device that is internal or external to the video sink 120. The stored or buffered video may be then available for further processing, such as measuring the quality of that video in comparison to the source video, transmitted by the video source 110, as described below with respect to FIG. 11.

The video source 110 and video sink 130 are shown as a server computer and a smart television, respectively, but the principles of the present disclosure accommodate other types of equipment than those shown. Such devices may be embodied in smartphones, tablet computers, laptop computers, media playback devices, gaming consoles or other computing devices capable of processing, receiving and/or transmitting video streams. Such variations in the types of video source and video sink devices are immaterial to the present discussion except as discussed hereinbelow.

Similarly, the network 130 may be any communication link capable of delivering video data 134. The network 130 may comprise wired or wireless communication links. For example, video 134 may be transmitted utilizing Wi-Fi, Blue-tooth, and/or cellular protocols. Video 134 may also be distributed over cables, satellite, broadcasted over the air, or a combination thereof.

Figure 2:
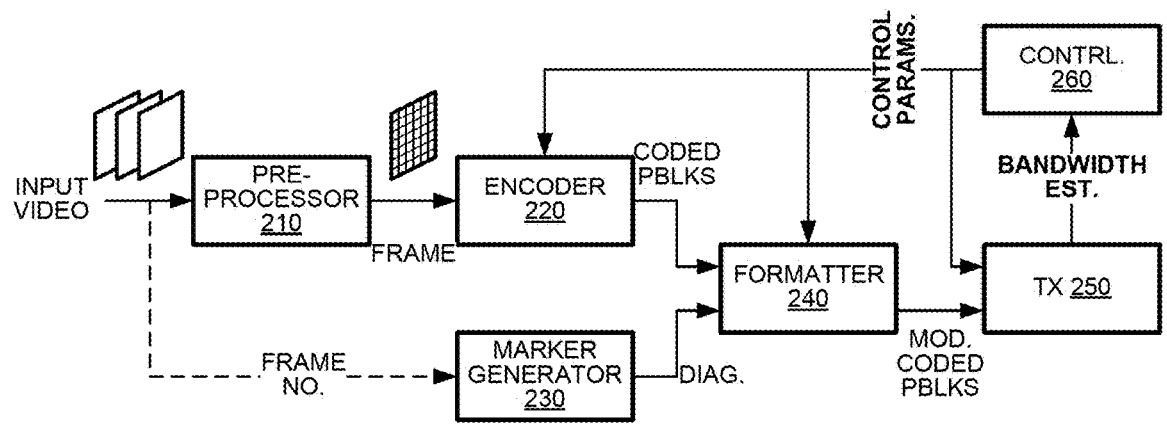
FIG. 2 is a block diagram of a video source device according to an aspect of the present disclosure.

FIG. 2 is a block diagram of a video source 110 (FIG. 1) according to an aspect of the present disclosure. The video source 110 may include a pre-processor 210, an encoder 220, a marker generator 230, a formatter 240, and a transmitter 250 operating under control of a controller 260. The pre-processor 210 and the encoder 220 may process frames of input video, respectively, to achieve bandwidth compression. The marker generator 120 may create diagnostic information for each frame of the input video sequence. The formatter 240 may assemble a coded video data stream from the coded video data output by the encoder 220 and the diagnostic information output from the marker generator 230. Specifically, the formatter 240 may generate a data stream from the coded video that adheres to a syntax specified by a governing coding protocol to which the input video is being coded. The formatter 240 may replace certain elements of coded video data with data representing the diagnostic information generated by the marker generator 230. The transmitter 250 may transmit the video data stream to a destination device (not shown). Alternatively, the video data stream from the formatter 240 may be stored (not shown) for later transmission.

The marker generator 230 may generate diagnostic information to replace coded pixel block data output from the encoder 220 for select spatial locations of a frame. As discussed hereinbelow, a frame's diagnostic information may become a displayable marker when coded video is decoded and displayed, and it may represent each frame uniquely. For example, the diagnostic information may represent a frame number, a picture order count, or a time code. The marker generator 230 may output data for each pixel block representing a portion of the marker that is to be carried by the respective pixel block.

The pre-processor 210 and the encoder 220 have roles in run-time coding of video. Typically, a pre-processor 210 performs conditioning operations on input video to prepare it for coding. Typical conditioning operations include frame rate modification, frame size modification, and filtering operations (e.g., denoising filtering and the like). Input frames are partitioned spatially into smaller sub-units, called "pixel blocks," for convenience. The encoder 220 may apply compression operations to the frames working on a pixel-block-by-pixel-block basis. The encoder 220, for example, may perform motion-compensation based prediction operations, where the encoder 220 searches for previously-coded pixel blocks, either from the same frame as is being coded or from previously-coded reference frames, that provide prediction matches for an input pixel block, then codes the input pixel block differentially with respect to a selected prediction block. Each pixel block's prediction residuals obtained from the differential processing may be subject to other coding processes, such as frequency-based transform coding, quantization and entropy coding. Thus, the encoder 220 may output coded data on a pixel-block-by-pixel-block basis. Each coded pixel block represents visual content of the source frame in a spatial area corresponding to the pixel block's location.

During run-time operation, the formatter 240 may integrate the coded pixel block data into a larger data stream that includes other content elements (e.g., coded audio content) according to a syntax that is dictated by the coding protocol to which the video source 200 adheres. When supporting diagnostic mode operation, the formatter 240 may replace data of select coded pixel blocks with content representing diagnostic information.

The controller 260 may generate control parameters that govern operation of the encoder 220 and/or the formatter 240 within the video source device 200. The controller 260, for example, may select bitrate budgets for individual frames of the video sequence or to coding types that are assigned by the encoder. For example, the controller may set a target bitrate budget of 1 Mbps that may be set for the coded video sequence overall, or it may set target bitrate budgets for frames of predetermined coding types (e.g., an intra-coded frame may have a first target bit size, a unidirectionally coded inter-coded frame may have a second target bit size, and a bi-directionally coded inter-coded frame may have a third target bit size). Additionally, the controller 260 may respond to exigencies in coding operation, which may arise, for example, when bandwidth estimates reported by the transmitter 250 indicate drops in available communication bandwidth, by causing either the formatter 240 or transmitter 250 to drop coded frames prior to transmission.

FIGS. 3 and 4 illustrate operation of the formatter 240 (FIG. 2) during run-time operation and when supporting diagnostic mode operation according to an aspect of the present disclosure. FIG. 3 illustrates an exemplary data stream 300 that may be generated by the formatter 240 during run time operation. A frame may be represented by a frame header 310 that indicates the presence of a frame and distinguishes the frame from other syntax elements that may be present in the coded data stream 300. The frame may be represented by a plurality of coded pixel blocks 320.1-320.*n* that follow the frame header 310. The coded pixel blocks each may contain a pixel block header 322.1, 322.2, ..., 322.*n* that distinguishes the coded pixel block data from other data elements in the coded data stream 300 and pixel block data 324.1, 324.2, ..., 324.*n* representing content of the pixel block data itself. The data stream 300 of FIG. 3 may be assembled from coded pixel block data output by the encoder 220 during ordinary run-time operation.

FIG. 4 illustrates a data stream 400 that may be generated by the formatter 240 (FIG. 2) to support a diagnostic mode. The formatter 400 may generate a data stream 400 that conforms to the syntax of its governing coding protocol. Accordingly, each frame may be represented by a frame header 410 that distinguishes the frame data from other syntax elements that may be present in the coded data stream 300. Each frame may be represented by a plurality of coded pixel blocks 420.1-420.*n* that follow the frame header 410. The coded pixel blocks each may contain a pixel block header 422.1, 422.2, ..., 422.*n* that distinguishes the coded pixel block data from other data elements in the coded data stream 400 and a field 424.1, 424.2, ..., 424.*n* for pixel block data. To support the diagnostic mode, the formatter 240 (FIG. 2) may replace data of select pixel blocks 420.*k*-420.*n* with content representing diagnostic information 424.*k*-424.*n* generated by the marker generator 230 FIG. 2). Coded pixel block data for other pixel blocks 420.1-420.*k*-1 may appear as provided by the encoder 220 (FIG. 2).

FIG. 5 illustrates an exemplary video frame 500 that may be generated by the foregoing techniques. There, the frame is illustrated as rendered frame data represented by a plurality of pixel blocks 510.1-510.*n*. Content of a predetermined number of the pixel blocks 510.*k*-510.*n* is shown as having been replaced by a marker 520 formed from diagnostic information. The displayed marker 520 may identify the frame 500 uniquely within the data stream.

During operation, a video sink device 120 may receive, decode and display coded frames as they are received. When supporting frames created according to the diagnostic mode, the frames each may include diagnostic information that, when decoded and rendered, cause markers 520 to be displayed on an ongoing basis. Each frame's marker 520 may uniquely identify the respective frame. Therefore, if frames are lost or dropped as they are generated by a video source 110 (FIG. 1), transmitted from the video source 110 to a video sink 120, and/or are decoded and rendered by a video sink device 120, lost frames may be identified from observations of the markers 520 of the frames as they are displayed. Similarly, if certain frames are displayed for prolonged display periods, owing for example to the loss of other frames, frames with prolonged display durations may be identified from observations of the markers 520. Diagnostic personnel, for example, may review videos that capture recovered video as it is rendered by a video sink 120 (captured, for example, by a capture device 140) to identify and diagnose operational events that occur during performance of a video delivery system.

In an aspect, markers inserted to frames of the source video, transmitted from the video source 110, may be directly extracted from the coded video, received at the video sink 120. The extracted markers may be used to associate frames from the received video with corresponding frames from the source video. Association of corresponding frames from the source video and the received video may facilitate comparison among these frames. Such comparison may enable measuring video quality degradation that may be contributed, for example, by losses of data packets representing image regions within the coded frames; or, by low quality coding owing to bandwidth budgeting processes performed by the video source device 110 as it codes the video.

In an aspect, a video quality metric and identification of video losses or degradation may be determined by analysis of the extracted markers. In a first example, the extracted markers may be used to identify a correspondence between reconstructed video frames and source video frames, such as by construing the extracted markers as timestamp with a predetermined correspondence source video frames or by comparing extracted video markers to markers inserted by formatter 240. In this first example, after a correspondence between recovered frames and source video frame is identified from the extracted markers, recovered frames can be compared to the corresponding source video frames, and the comparison may be used, for example, to generate a video quality metric for image portions outside of the markers. In a second example, missing frames may be identified by analysis of a sequence of extracted markers to identify missing markers where the markers represent a sequential frame count or predetermined pattern in a picture order count. This second example may enable determining a quality metric or identification of frame loss or degradation without identifying a correspondence to specific source video frames, and without access to the marker generation process. A third example for generating quality metrics is depicted in FIG. 11, for example based on two encoded video sequences.

Returning to FIG. 2, aspects of the present invention permit video source devices 200 to support diagnostic modes while retaining operation that mimic run-time operation as closely as possible. During diagnostic operation, the encoder 220 may operate under the same conditions as it would operate during a run-time operation. Thus, it may code input frames of video according to the same processes in response to control parameters from the controller 260 as it would during a run-time operation. The encoder 220 may allocate coding bits to pixel blocks of the frame that will be replaced by diagnostic information from the marker generator 230 as if the marker generator 230 were not operational. Thus, diagnostic information can be added with minimal alteration of operation of the encoder 220.

Figure 6:
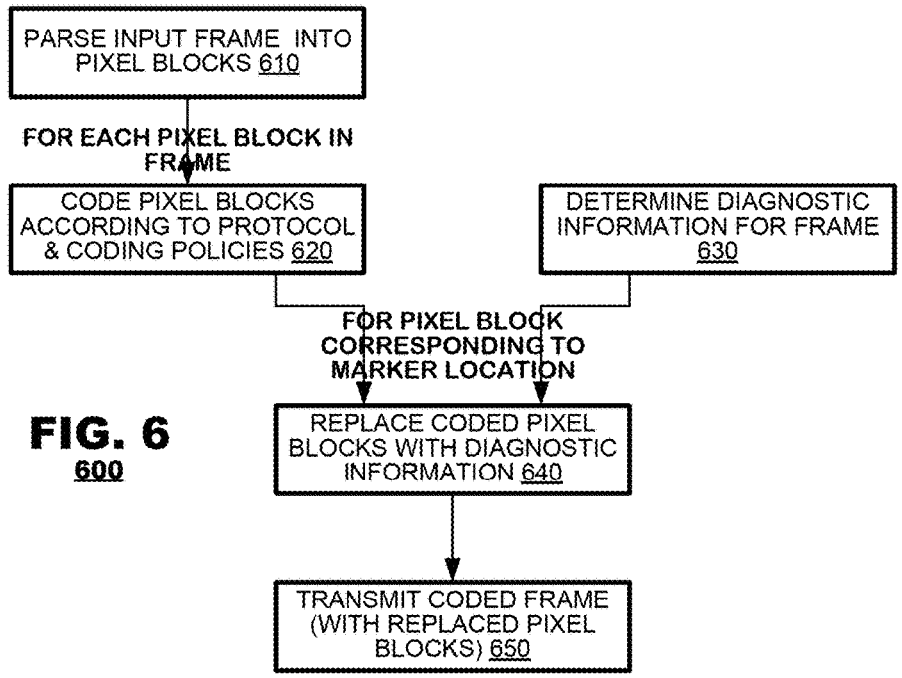
FIG. 6 illustrates a method for inserting diagnostic information into a source video according to an aspect of the present disclosure.

FIG. 6 illustrates a method 600 for coding video according to a diagnostic mode according to an aspect of the present disclosure. The method 600 may parse an input frame into pixel blocks (box 610) and may code each pixel block of the frame according to a governing coding protocol (box 620). The method 600 also may generate diagnostic information for the frame (box 630). For each pixel block in a spatial location of the frame that corresponds to the marker, the method 600 may replace coded pixel block data generated at box 620 with data representing the diagnostic information (box 640). Thereafter, the method 600 may transmit the coded frame with the replacement pixel block data added at box 640 (box 650). The method 600 may repeat for each frame of a video sequence that is to be processed according to the diagnostic mode.

Figure 7:
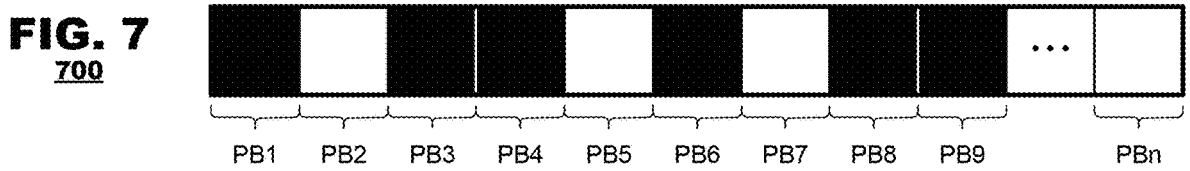
FIG. 7 illustrates an exemplary marker according to an aspect of the present disclosure.
Figure 8:
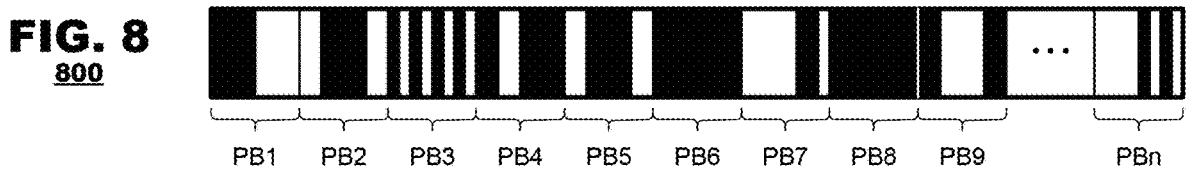
FIG. 8 illustrates an exemplary marker according to another aspect of the present disclosure.
Figure 9:
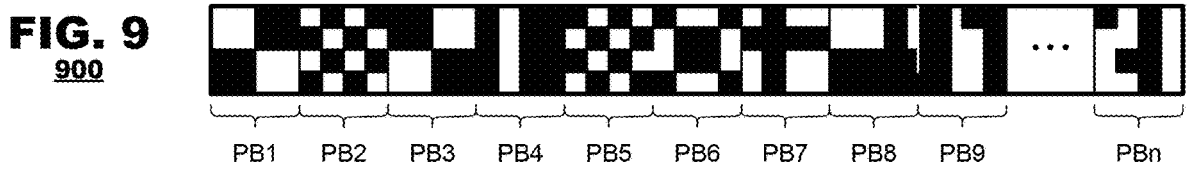
FIG. 9 illustrates an exemplary marker according to a further aspect of the present disclosure.

Diagnostic information may be represented in markers in a variety of ways. FIGS. 7-9 illustrate exemplary markers according to various aspects of the present disclosure. In a first aspect, shown in FIG. 7, a marker 700 is represented by a plurality of pixel blocks PB1-PBq each pixel block may be coded either as a black pixel block or a white pixel block. In this embodiment, the pixel blocks PB1-PBq may carry one bit of information apiece.

Aspects of the present disclosure include markers represented by a plurality of pixel blocks that may each carry more than one bit of information. In the example illustrated in FIG. 8, each pixel block PB1-PBq carries multiple bits of information. Many coding protocols natively support transforms, such as the discrete cosine transform ("DCT") or discrete sine transform ("DST"), in which pixel residual data are transformed to frequency-domain coefficients. In an aspect, multi-bit diagnostic information may be represented by coefficients of such frequency-domain transforms. The coefficients may be coded as otherwise provided for according to the governing coding protocol. The example of FIG. 8 illustrates utilization of coefficients representing frequencies in a single spatial dimension (e.g. horizontally). In the example of FIG. 9, coefficients representing spatial frequencies in multiple dimensions may be employed. It is expected that, in practice, the amount of data to be carried by individual pixel blocks will be tailored to suit individual applications based on the range of diagnostic information to be carried and the capability of capture devices 140 (FIG. 1) that will capture markers when they are displayed by sink devices 120.

Markers need not be represented in monochrome fashion. In another aspect, diagnostic information may vary color content within such pixel blocks or may employ grayscale coding to encode a greater number of bits per pixel block.

Additionally, markers need not be represented as a "strip" of pixel blocks as shown in FIGS. 7-9. In other aspects, the markers may be represented by a two-dimensional array of pixel blocks, in a manner analogous to those used for QR codes. Indeed, diagnostic information may be coded into replaced pixel blocks in a manner that causes QR codes to be displayed when they are decoded and rendered, in which a frame's QR code represents the frame's diagnostic information.

In an aspect, the plurality of pixel blocks PB1-PBq, representing a frame's marker, may be encoded in accordance with the governing coding protocol used to encode the source video. Thus, the encoding of the plurality of pixel blocks PB1-PBq may be done as part of the insertion operation (e.g., at the formatter 240).

In another aspect, pre-coded pixel blocks may be retrieved from a look-up table and may be used as codes representative of the plurality of pixel blocks PB1-PBq.

Figure 10:
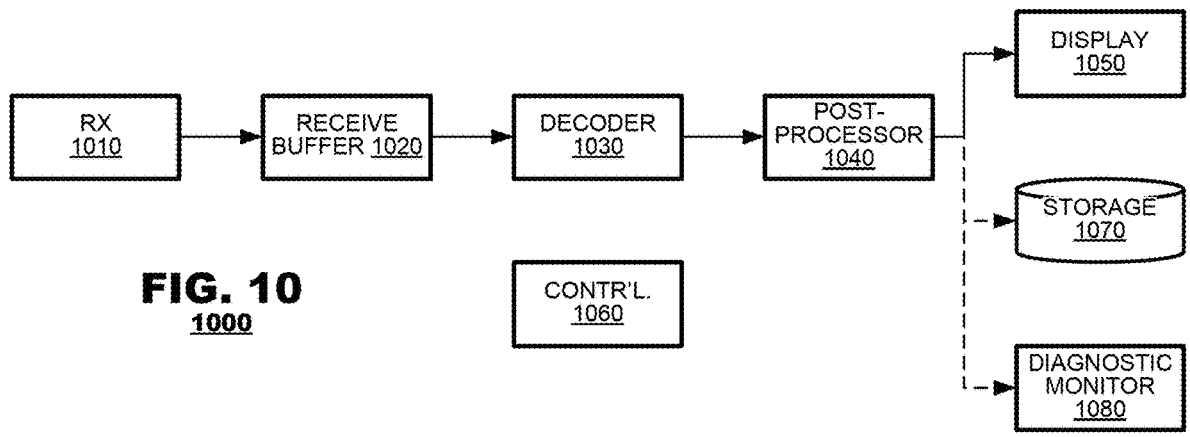
FIG. 10 illustrates a video sink device according to an aspect of the present disclosure.

FIG. 10 illustrates a video sink device 1000 according to an aspect of the present disclosure. The device 1000 may include a receiver 1010, a receive buffer 1020, a decoder 1030, a post-processor 1040, and a display 1050 operating under control of a controller 1060. The video sink device 1000 may receive coded video data from a video source device 110 (FIG. 1) and decode it. The video receiver 1010 may receive a coded data stream from a communication network and assemble the coded video data therefrom, which is stored in the receive buffer 1020. The device 1000 may parse the coded data stream according to syntactic elements contained therein and route different elements of coded data stream to respective functional units within the video sink device 1000. For example, coded video data may be routed to the decoder 1030. Other elements, such as coded audio data, may be routed to other processing elements (not shown). The decoder 1030 may decode video data according to the decoding operations specified by the governing coding protocol. The post-processor 1040 may perform additional processing operations to condition the recovered video for display. The recovered video may be displayed on a display device 1050.

In an aspect, the decoder 1030 and the post-processor 1040 may operate according to the same processes when the system 100 (FIG. 1) operates in both an ordinary run-time mode of operation and a diagnostic mode of operation. As discussed, the decoder 1030 may decode coded video according to a governing coding protocol for the system. For pixel blocks whose coded image information was replaced by coded diagnostic information, the decoder 1030 may process the diagnostic information contained therein according to the coding protocol and may generate image information therefrom, for example, as shown in FIGS. 7-9. Post processing operations typically involve filtering operations (denoising filtering, debanding filtering, and the like), which are selected to improve the perceived quality of recovered video generated by an encoder. Here as well, the post-processor 1040 may operate according to the same processes when supporting the diagnostic mode as it would when supporting ordinary run-time operation.

As discussed, displayed video may be captured by a capture device 140 (FIG. 1) to generate a captured video from which to assess quality of the video coding system. The capture device may sample rendered video at a rate at least twice the expected display frame rate. In this manner, it is expected that the captured video will contain sufficient information from which to detect frame drops and other eccentricities in delivered frame rates.

In an aspect, rather than output video to a display device 1050, recovered video from the post-processor 1040 may be stored in internal storage 1070 of the video sink device 1000. For example, many consumer devices include graphics processing systems with frame memories that store video images before they are rendered. In an aspect, contents of such frame memories may be stored for later review and analysis to assess system 100 (FIG. 1) performance.

In a further aspect, a video sink device 1000 may include a diagnostic monitor 1080 which analyzes recovered frame data for predetermined events. The diagnostic monitor 1080, for example, may convert displayable marker data into frame identifiers and may generate alerts in response to predetermined events. For example, if the diagnostic monitor 1080 detects that frames are displayed in non-consecutive order, the diagnostic monitor 1080 may generate an alert. If the diagnostic monitor 1080 detects a frame that is displayed for a duration that is longer than an ordinary frame display duration (because, for example, the system repeats its display), the diagnostic monitor may generate an alert. The diagnostic monitor 1080 may store the recovered video in storage 1070 with metadata identifying frames that caused the alerts to assist diagnostic personnel to identify and analyze such frames.

The principles of the present disclosure accommodate several variations of the proposed techniques. In one aspect, for example, markers may be placed in a location of frames that ordinarily are not visible during rendering. Video delivery systems 100 (FIG. 1) sometimes utilize coding techniques in which a coded frame has a frame size that exceeds the display size of a video sink's display device. In such an aspect, a video source device 110 may select replacement pixel blocks from an area of a coded frame that ordinarily is not part of the visible area of the frame upon decoding and display.

In an aspect, coded frames generated by the formatter 240 (FIG. 2) may serve as reference pictures for encoder coding operations of later-processed frames. In this aspect, when the encoder 220 processes pixel blocks of a newly-received frame from input video, marker content from the earlier-processed frames will be available for use as prediction sources. In many use cases, the encoder's prediction search processes will avoid selecting the marker content as a source of prediction because it will be a poor match for content of the new frame. In another aspect, operation of the encoder 220 may be constrained to prevent new pixel blocks from being predicted from replacement pixel blocks of previously-processed frames.

FIG. 11 is a block diagram of a diagnostic system 1100 according to an aspect of the present disclosure. The diagnostic system 1100 may comprise decoders 1130, 1140, a frame buffer 1150, a frame correspondence detector 1160, and a video quality estimator 1170. The system may receive as an input to decoder 1130 a first coded video 1110 with diagnostic information inserted into the code of each of its frames, e.g., the output of the formatter 240 of FIG. 2. The system may also receive as an input to decoder 1140 a second coded video 1120, the second coded video is the first coded video 1110 after enduring transmission via a network 130 of FIG. 1, e.g., the output of the receiver 1010 of FIG. 10. The decoded frames of the first video and the second video may then be buffered 1150 to be available for further processing by the frame correspondence detector 1160. In an aspect, decoder 1130 or 1140 may not be necessary, as the first video and/or the second video may be already decoded by a system external to the diagnostic system 1100. In yet another aspect, the first video and/or the second video may be accessible from a storage local or remote to the diagnostic system 1100.

The frame correspondence detector 1160 may employ techniques that match frames from the first video 1110 to their counterpart frames from the second video 1120. Such techniques may utilize the markers discussed hereinabove, and system described in the present disclosure to identify frame-correspondence between the two buffered 1150 video streams 1110 and 1120. For example, pattern-recognition-based methods may be used to extract frames' identifiers from the markers embedded in the frames of the first video 1110 and second video 1120. The video quality estimator 1170 may then compute various video quality metrics 1180 based on video data derived from corresponding frames. As explained above, the present disclosure provides techniques for facilitating frame-correspondence detection by means of diagnostic information inserted into the coded frames of a source video without transcoding—that is the markers, identifying frames of the source video, may be inserted into the coded frames without the need to first decode, insert, and then encode back each frame. This method enables measuring the quality degradation that is due to transmission over a network, excluding added degradation that may have been caused by a transcoding done to facilitate diagnostic information insertion.

FIG. 12 is a simplified block diagram of a processing system 1200 according to an aspect of the present disclosure. As illustrated in FIG. 12, the processing system 1200 may include a processor 1210, a memory system 1220, a codec 1230, a transmitter 1240, and a receiver 1250 in mutual communication. The memory system 1220 may store program instructions that define the operation of methods as discussed herein in reference to FIGS. 1-10, which may be executed by the processor 1210. The video stream whose quality may be diagnosed according to aspects of the present disclosure may be coded 1230 before transmission over a network 130 and may be then de-coded 1230 when received by the receiver 1250.

Thus, the methods discussed herein may be embodied as programming instructions that are executed by processing systems 1200. Typically, the system 1200 includes one or more microprocessors 1210 that retrieve program instructions from a memory 1220 within the system. The memory 1220 may include electrical-based, optical-based, and/or magnetic-based memory devices. Similarly, the system may store the data records discussed herein in such memory devices.

Implementations of the processing system 1200 may vary. For example, the codec 1230 may be provided as a hardware component within the processing system 1200 separate from the processor 1210 or it may be provided as an application program executed by the processor 1210 of the processing system 1200. The principles of the present invention find application with either embodiment.

The foregoing discussion has described operations of aspects of the present disclosure in the context of video source and video sink devices, including the marker inserter system 120 and the diagnostic system 150. Commonly, these components are provided as electronic devices. Video systems and network channels can be embodied in integrated circuits, such as application specific integrated circuits, field programmable gate arrays, and/or digital signal processors. Alternatively, they can be embodied in computer programs that execute on camera devices, personal computers, notebook computers, tablet computers, smartphones, or computer servers. Such computer programs are typically stored in physical storage media such as electronic-based, magnetic-based storage devices, and/or optically-based storage devices, where they are read into a processor and executed. Decoders are commonly packaged in consumer electronic devices, such as smartphones, tablet computers, gaming systems, DVD players, portable media players, and the like. They can also be packaged in consumer software applications such as video games, media players, media editors, and the like. And, of course, these components may be provided as hybrid systems with distributed functionality across dedicated hardware components and programmed general-purpose processors, as desired.

Video systems of devices, including encoders and decoders, may exchange video through channels in a variety of ways. They may communicate with each other via communication and/or computer networks as illustrated in FIG. 1. In still other applications, video systems may output video data to storage devices, such as electrical, magnetic and/or optical storage media, which may be provided to decoders sometime later. In such applications, the decoders may retrieve the coded video data from the storage devices and decode it.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A method for inserting diagnostic information into a video stream, comprising:
   coding source frames of the video stream according to a bandwidth compression protocol;
   replacing syntactic element(s) of each coded frame with diagnostic information, the syntactic element(s) corresponding to a portion of visual content from the respective source frame; and
   transmitting the coded frames with their respective diagnostic information to a destination device.

2. The method of claim 1, wherein the diagnostic information is monochrome content.

3. The method of claim 1, wherein the syntactic element(s) are H.264 macroblocks.

4. The method of claim 1, wherein the syntactic element(s) are HEVC coding units.

5. The method of claim 1, wherein the element(s) are one of AV1, AV2, or VP9 coding units.

6. The method of claim 1, wherein the replaced syntactic element(s) correspond to a common predetermined spatial location of the frames across the video stream.

7. The method of claim 1, wherein the diagnostic information of each frame uniquely identifies the frame within the video stream.

8. A decoding method, comprising:
   receiving coded video data representing a source video sequence, the coded video data having diagnostic information provided as a replacement for coded visual content within predetermined syntactic element(s) of each coded frame, the syntactic element(s) corresponding to a non-visible spatial portion of visual content from the respective source frame;
   decoding the coded video data; and
   generating displayable video data from the decoded video data, the displayable video data including a marker in a predetermined spatial location containing information derived from the diagnostic information.

9. The method of claim 8, further comprising:
   rendering the decoded video data on a display device, the rendering including displaying a marker in a predetermined spatial location of the video containing information derived from the diagnostic information; and
   capturing the rendered decoded video data by a video capture device.

10. The method of claim 8, further comprising storing the displayable video data.

11. The method of claim 8, further comprising:
    analyzing markers from multiple frames of the displayable video data; and
    generating an alert based upon the marker analysis.

12. The method of claim 8, wherein the marker contains monochrome content.

13. The method of claim 8, wherein the marker contains a QR code.

14. The method of claim 8, wherein the syntactic element(s) are H.264 macroblocks.

15. The method of claim 8, wherein the syntactic element(s) are HEVC coding units.

16. The method of claim 8, wherein the syntactic element(s) are one of AV1, AV2, or VP9 coding units.

17. The method of claim 8, wherein the marker is displayed at a common predetermined spatial location of the video, the spatial location determined by a location represented by the syntactic elements.

18. The method of claim 8, wherein the diagnostic information of each frame uniquely identifies the frame within the video sequence.

19. The method of claim 8, wherein the portion of visual content from the respective source frame are located within a non-visible portion of the frame.

20. A system, comprising:
    a pixel block-based video coder, having an input for frames of a video stream, and an output for code pixel blocks representing each frame;
    a marker generator generating codes that uniquely represent each frame; and
    a formatter that replaces select coded pixel blocks of each frame with data corresponding to the generated frame's code.

21. The system of claim 20, wherein the video coder operates according to H.264.

22. The system of claim 20, wherein the video coder operates according to HEVC.

23. The system of claim 20, wherein the video coder operates according to one of AV1, AV2, or VP9 coding units.

24. The system of claim 20, wherein the select pixel blocks correspond to a common spatial location of the frames.

25. The system of claim 20, wherein the select pixel blocks correspond to a non-visible portion of the frames when displayed.

26. A non-transitory computer-readable medium comprising instructions executable by at least one processor to perform a method comprising:
    coding source frames of a video stream according to a bandwidth compression protocol;
    replacing syntactic element(s) of each coded frame with diagnostic information, the syntactic element(s) corresponding to a portion of visual content from the respective source frame; and
    transmitting the coded frames with their respective diagnostic information to a destination device.

27. The method of claim 8, wherein the syntactic element(s) corresponding to a non-visible spatial portion of visual content replaces a coded portion of the visual content.

28. A decoding method, comprising:
    receiving coded video data representing a source video sequence, the coded video data having diagnostic information provided within predetermined syntactic element(s) of each coded frame, the syntactic element(s) replacing a coded portion of visual content from the respective source frame;
    decoding the coded video data; and
    generating displayable video data from the decoded video data, the displayable video data including a marker in a predetermined spatial location containing information derived from the diagnostic information.

\* \* \* \* \*